_United States Patent Office_

3,541,112
Patented Nov. 17, 1970

3,541,112
1-(ALICYCLIC SUBSTITUTED CARBONYL)-3-INDOLYL ALIPHATIC ACID DERIVATIVES
Hisao Yamamoto, Nishinomiya-shi, Yasushi Nakamura, Hirakata-shi, Toshio Atsumi, Takarazuka-shi, Masaru Nakao, Osaka, Tsuyoshi Kobayashi, Minoo-shi, and Chiharu Saito and Hiroshi Awata, Toyonaka-shi, Japan, assignors to Sumitomo Chemical Company, Ltd., Osaka, Japan, a corporation of Japan
No Drawing. Filed July 7, 1967, Ser. No. 651,705
Claims priority, application Japan, July 13, 1966, 41/46,141
Int. Cl. C07d 27/56
U.S. Cl. 260—326.13                    9 Claims

---

ABSTRACT OF THE DISCLOSURE

A new 1-acyl-3-indolyl aliphatic acid derivative having anti-inflammatory and anti-cholesterolemic effects which is characterized in that the 1-acyl-substituent is an alicyclic-substituted carbonyl or an alicyclic-substituted alkylcarbonyl group, and processes for producing such compound.

---

The present invention relates to novel N-substituted indole derivatives having high anti-inflammatory, anti-pyretic, analgesic and anti-cholesterolemic activities and to processes for producing the same. More particularly, the present invention relates to novel 1-(alicyclic group substituted carbonyl)-3-indolyl aliphatic acid derivatives or 1-(alicyclic group substituted alkyl-carbonyl)-3-indolyl aliphatic acid derivatives and processes for producing the same.

Of the developed non-steroidal anti-inflammatory compounds, 1-(p-chlorobenzoyl)-2-methyl-5-methoxy - 3 - indolylacetic acid is the greater anti-inflammatory activity, but it is remarkably high in acute and chronic toxicities. The present inventors observed that even when 10 mg./kg. of said compound was orally administrated to animals, occult bleeding was observed in feces. In addition thereto, all the conventional anti-inflammatory compounds tend to promote the bleeding of digestive organs and not few examples have been reported that perfolations of the stomach and intestines brought one to death. Further, 1,2-diphenyl - 3,5 - dioxo-4-n-butylpyrazolidine (phenyl butazone), which is most widely used as antiphlogistic now-a-day, has low activity in comparison with its high acute toxicity and hence is considerably small in therapeutic ratio.

The syntheses of indole derivatives having acyl groups at the N-positions are described in, for example, Elderfield: "Heterocyclic Compounds," vol. 3 (1952), chapter 1, pages 1–247, and W. C. Sumpter and F. M. Miller: "Heterocyclic Compounds with Indole and Carbazole Systems" (1954), pages 1–69. 1-substituted acyl groups of 1-acyl-indole derivatives are so easily hydrolyzed by acid or alkali that it has been considered impossible to obtain 1-acyl-indole derivatives directly from corresponding N¹-acylated phenylhydrazine derivatives by Fischer's indolization. Suvorov et al. [Suvorov et al.: Doklady Acad. Nauk U.S.S.R., 136, 840 (1961), Chem. Abstr., 55, 17621 (1961), J. Gen. Chem., U.S.S.R., 28, 1058 (1958)] have recently reported this problem as follows:

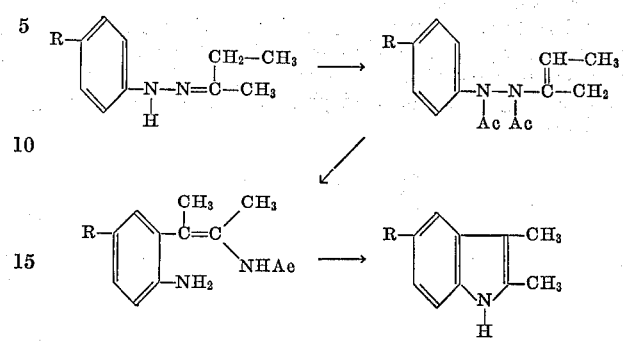

The present inventors prepared many 1-acyl-3-indolyl aliphatic acid derivatives and tested various kinds of pharmacological effects thereof. As a result, the present inventors found novel 1-acyl-3-indolyl aliphatic acid derivatives having high anti-inflammatory, anti-pyretic, analgesic and anti-cholesterolemic activities.

One object of the present invention is to provide novel 1-acyl-3-indolyl aliphatic acid derivatives having high anti-inflammatory, anti-pyretic, analgesic and anti-cholesterolemic activities and processes for producing such derivatives.

Another object of the present invention is to provide processes for economically manufacturing these compounds in a high yield.

A further object of the present invention is to provide a novel pharmaceutical composition containing these compounds as an effective ingredient. Other objects will be apparent from a following description.

In order to accomplish these objects, the present invention provides novel 1-acyl-3-indolyl aliphatic acid derivatives of the formula:

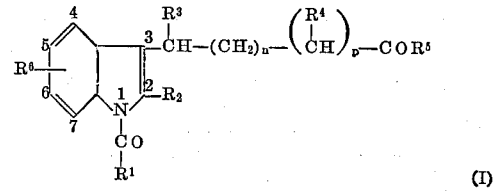

wherein $R^1$ is a non-substituted, or a halogen-, alkyl- or phenyl-substituted or benzene ring-condensed, saturated or unsaturated mono- or poly-alicyclic group, or an alkyl group substituted by said alicyclic group; $R^2$ and $R^3$ are, individually a hydrogen atom or lower alkyl group; $R^4$ is a hydrogen atom or alkoxycarbonyl group; $R^5$ is a hydroxy, alkoxy, benzyloxy, tetrahydropyranyloxy or amino group; $R^6$ is an alkyl, alkoxy or alkylthio group or a halogen or hydrogen atom; $p$ is 0 or 1; and $n$ is 0 or an integer of 1 to 3.

Further, the present invention provides a process for producing novel 1-acyl-3-indolyl aliphatic acid derivatives represented by the Formula I, which comprises reacting an N¹-acylated phenylhydrazine derivative of the formula:

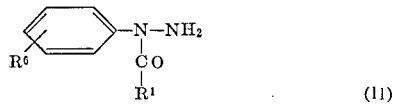

(II)

wherein $R^1$ and $R^6$ have the same meanings as identified above, or a salt thereof with a ketone compound of the formula:

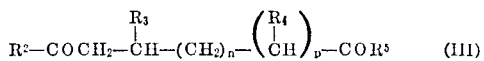

(III)

wherein $R^2$, $R^3$, $R^4$, $R^5$, $n$ and $p$ have the same meanings as identified above, to yield the 1-acyl-3-indolyl aliphatic acid derivative (I).

Still further, the present invention provides a process for producing novel 1-acyl-3-indolyl aliphatic acid derivatives represented by the Formula I, which comprises decomposing an N¹-acylated phenylhydrazone derivative of the formula:

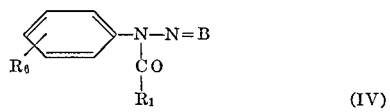

(IV)

wherein $R^1$ and $R^6$ have the same meanings as identified above, and B is a ketone or aldehyde residue, with an acid to yield an N¹-acylated phenylhydrazine derivative of the formula:

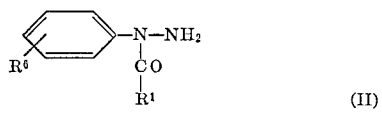

(II)

wherein $R^1$ and $R^6$ have the same meanings as identified above, and reacting the resultant N¹-acylated phenylhydrazine derivative represented by the Formula II with a keto-aliphatic acid derivative represented by the Formula III to yield an 1-acyl-3-indolyl aliphatic acid derivative (I).

Still further, the present invention provides a process for producing novel 1-acyl-3-indolyl aliphatic acid derivatives represented by the Formula I, which comprises reacting a phenylhydrazone derivative of the formula:

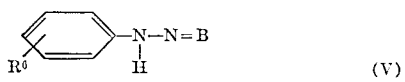

(V)

wherein $R^6$ and B have the same meanings as identified above, with a compound having the formula:

(VI)

wherein $R^1$ has the same meanings as identified above and Y represents a halogen or an ester residue, to yield an N¹-acylated phenylhydrazone derivative represented by the Formula IV, decomposing the resultant N¹-acylated phenylhydrazone derivative with an acid to yield an N¹-acylated phenylhydrazine derivative represented by the Formula II, and reacting the resultant N¹-acylated phenylhydrazine derivative represented by the Formula II with a keto-aliphatic acid derivative represented by the Formula III to yield the 1-acyl-3-indolyl aliphatic acid derivative (I).

Still further, the present invention provides a process for producing novel 1-acyl-3-indolyl aliphatic acid derivatives of the Formula I, which comprises reacting a phenylhydrazine derivative of the formula:

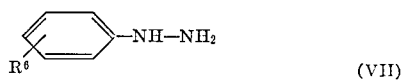

(VII)

wherein $R^6$ has the same meaning as identified above, with a compound having the Formula VI to yield an N¹-acylated phenylhydrazine derivative of the Formula II and reacting the resultant N¹-acylated phenylhydrazine derivative (II) with an aliphatic acid derivative of the Formula III to yield an 1-acyl-3-indolyl aliphatic acid derivative (I).

Still further, the present invention provides a process for producing novel 1-acyl-3-indolyl aliphatic acid derivatives of the formula:

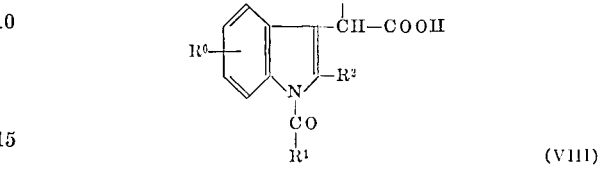

(VIII)

wherein $R^1$, $R^2$, $R^3$ and $R^6$ have the same meanings as identified above, which comprises reacting an N¹-acylated phenylhydrazine derivative of the Formula II with a compound of the formula:

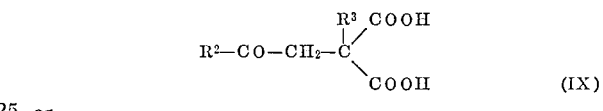

(IX)

or

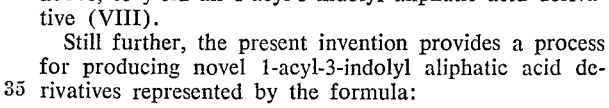

(X)

wherein $R^2$ and $R^3$ have the same meanings as identified above, to yield an 1-acyl-3-indolyl aliphatic acid derivative (VIII).

Still further, the present invention provides a process for producing novel 1-acyl-3-indolyl aliphatic acid derivatives represented by the formula:

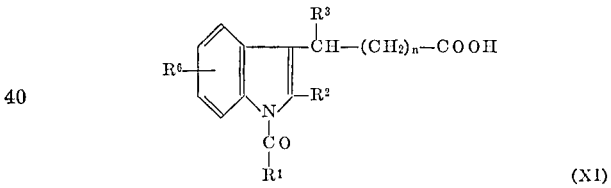

(XI)

wherein $R^1$, $R^2$, $R^3$, $R^6$ and $n$ have the same meanings as identified in the Formula I, which comprises converting a compound represented by the formula:

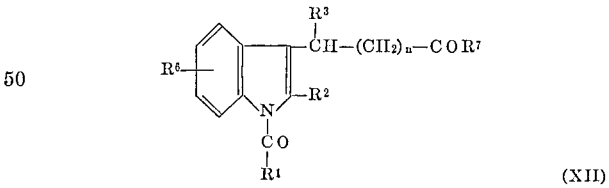

(XII)

wherein $R^1$, $R^2$, $R^3$, $R^6$ and $n$ have the same meanings as identified above; and $R^7$ represents an alkoxy, tetrahydropyranyloxy, benzyloxy or amino, to a 1-acyl-3-indolyl aliphatic acid derivative (XI).

Still further, the present invention provides a process for preparing 3-indolyl aliphatic acid derivatives represented by the Formula I which comprises reacting at an elevated temperature, in the absence or presence of an organic solvent and a suitable condensing agent, a hydrazone derivative represented by the general formula:

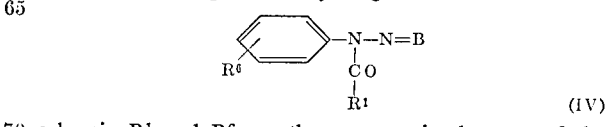

(IV)

wherein $R^1$ and $R^6$ are the same as in the case of the Formula I; and B is an aldehyde or ketone residue, with an aliphatic acid derivative represented by the formula:

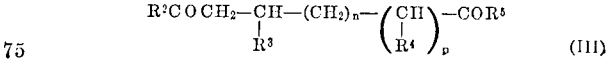

(III)

wherein $R^2$, $R^3$, $R^4$, $R^5$, $n$ and $p$ are the same as in the case of the Formula I.

Furthermore the present invention provides a pharmaceutical composition containing an effective amount of the 3-indolyl aliphatic acid derivative of the Formula I, as the essential active ingredient, and a pharmaceutically acceptable carrier.

According to the present invention, 1-acyl-3-indolyl aliphatic acid derivatives represented by the Formula I are prepared by the reaction shown by the following equations:

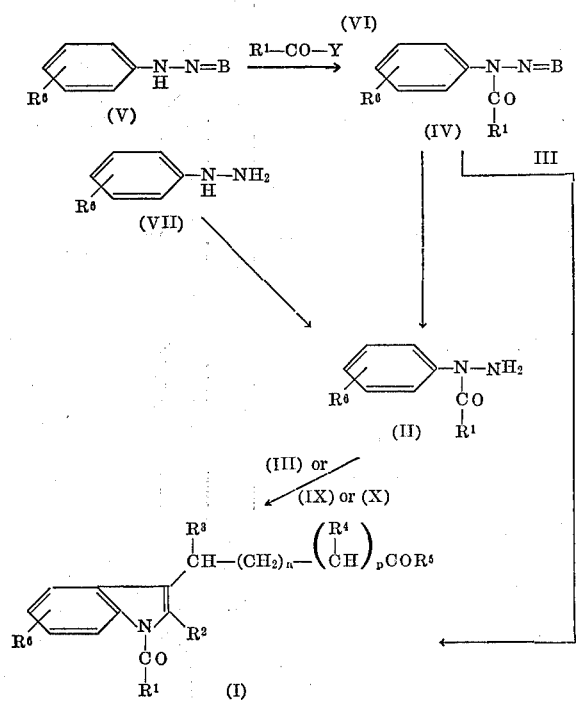

In the above formulae, $R^1$, $R^2$, $R^3$, $R^4$, $R^5$, $R^6$, B, Y, $n$ and $p$ have the same meanings as identified above.

In the processes of the present invention, $N^1$-acylated phenylhydrazine derivatives (II) and $N^1$-acylated phenylhydrazine derivatives (IV) can be synthesized by other processes than those discolsed herein. These intermediates, the compounds (II) and (IV), are novel compounds.

Next, the process of the present invention is explained in due order as follows.

Firstly, the reaction of a phenylhydrazone derivative (V) and a compound (VI) will be described.

The reaction of a phenylhydrazone derivative (V) with a compound (VI) is carried out in a basic solvent or in an inert solvent in the presence of a hydrogen halide acceptor. As the hydrogen halide acceptor, a tertiary amine, for example, pyridine or dimethylaniline can be used. These hydrogen halide acceptors themselves can be used as solvents. Inert solvents such as ether, benzene, toluene, and tetrahydrofuran are also able to be used as reaction solvents. At least an equimolar or larger amount of a hydrogen halide acceptor is required to accept the hydrogen halide which is produced in course of the reaction and to make the reaction progresses smoothly. The compound (VI) may be chloride, bromide, iodide or fluoride, and chloride is most preferable from commercial point of view. The reaction proceeds at a room temperature, and even below 0° C., and the yield is high. The exothermic reaction finishes in a few minutes or several hours. After the reaction finishes, the produced hydrogen halide salt of the hydrogen halide acceptor is filtered off and the filtrate is concentrated under reduced pressure, or the reaction mixture is poured into water or a solvent in which the aimed $N^1$-acylated phenylhydrazine is not dissolved, and the aimed $N^1$-acylated phenylhydrazone compound of the said Formula IV is easily obtained as crystals or an oily substance. These products can be purified by an appropriate solvent, for example, a solvent mixture of alcohol and water.

Examples of the $N^1$-acylated phenylhydrazone compounds obtained by the method of the present invention include following compounds.

Acetaldehyde $N^1$-(2-hydrindenylformyl)-$N^1$-(p-methoxyphenyl)hydrazone
Acetaldehyde $N^1$-(2-hydrindenylformyl)-N-$^1$-(p-methylthiophenyl)hydrazone
Acetaldehyde $N^1$-(2-hydrindenylformyl)-$N^1$-(p-methylphenyl)hydrazone
Acetaldehyde $N^1$-($\Delta^1$-tetrahydrobenzoyl)-$N^1$-(p-methylphenyl)hydrazone
Acetaldehyde $N^1$-($\Delta^1$-tetrahydrobenzoyl)-$N^1$-(p-chlorophenyl)hydrazone
Acetaldehyde $N^1$-($\Delta^1$-tetrahydrobenzoyl)-$N^1$-(p-methylthiophenyl)hydrazone
Acetaldehyde $N^1$-($\alpha$-cyclohexylpropionyl)-$N^1$-(p-methoxyphenyl)hydrazone
Acetaldehyde $N^1$-(4-phenyl-$\Delta^1$-tetrahydrobenzoyl)-$N^1$-(p-methoxyphenyl)hydrazone
Acetaldehyde $N^1$-(1,2,3,4-tetrahydro-2-naphthoyl)-$N^1$-(p-methoxyphenyl)hydrazone
Acetaldehyde $N^1$-(cyclohexylformyl)-$N^1$-(p-methoxyphenyl)hydrazone
Acetaldehyde $N^1$-(4-methyl-cyclohexylformyl)-$N^1$-(m-methoxyphenyl)hydrazone
Acetaldehyde $N^1$-(cyclohexylformyl)-$N^1$-(m-methylphenyl)hydrazone
Acetaldehyde $N^1$-(1-methyl-2-hydrindenylformyl)-$N^1$-(p-methoxyphenyl)hydrazone
Benzaldehyde $N^1$-(2-hydrindenylformyl)-$N^1$-(p-methoxyphenyl)hydrazone
Chloral $N^1$-(2-hydrindenylformyl)-$N^1$-(p-methoxyphenyl)hydrazone
Methylethylketone $N^1$-(2-hydrindenylformyl)-$N^1$-(p-methoxyphenyl)hydrazone
Acetphenone $N^1$-(2-hydrindenylformyl)-$N^1$-(p-methoxyphenyl)hydrazone In addition thereto, there are obtained compounds having as $R^1$ the following substituents:

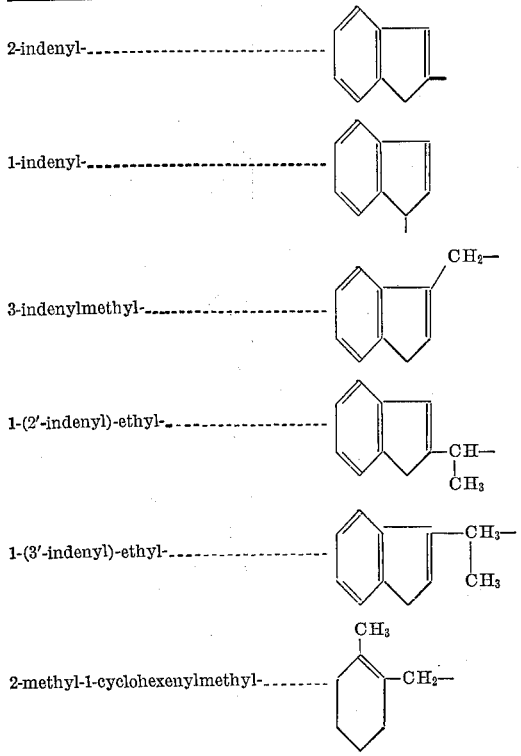

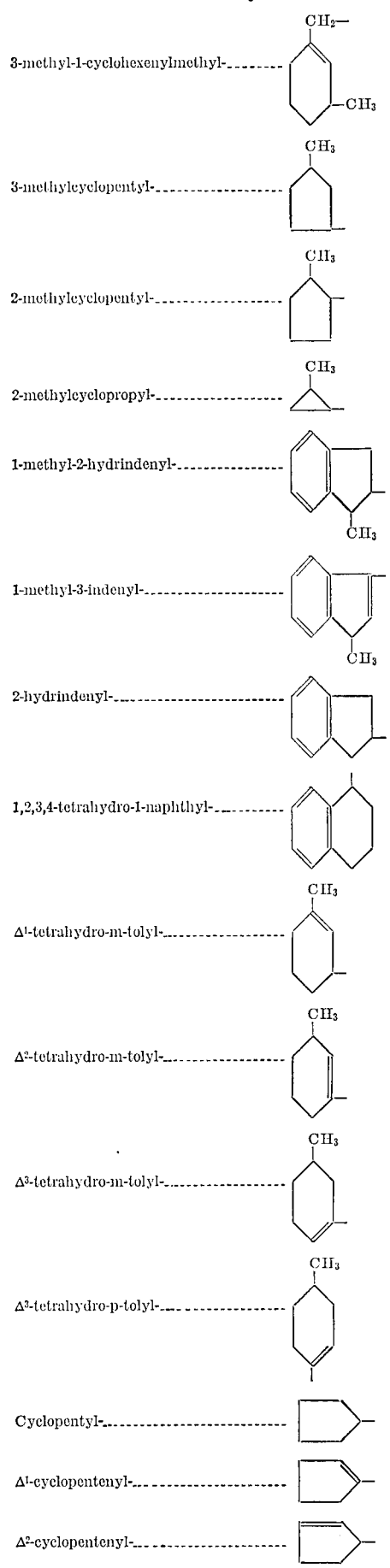
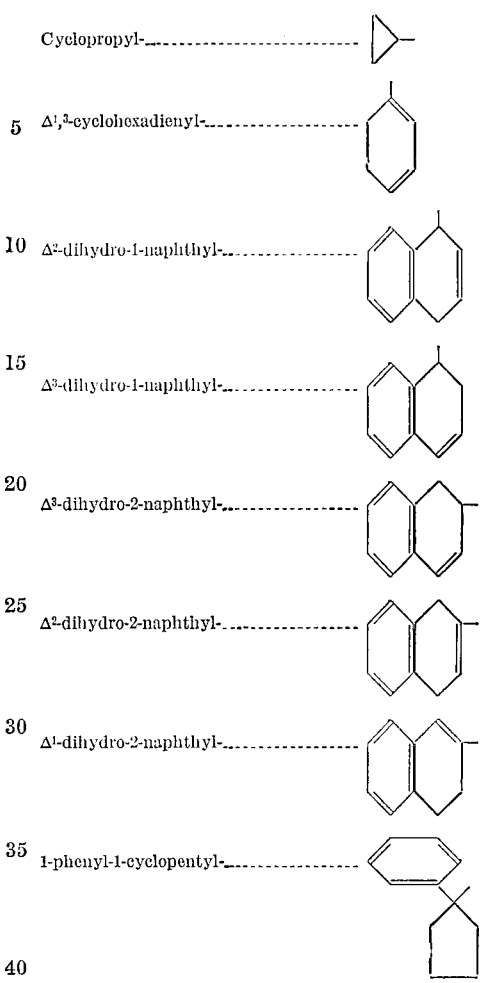

Those novel N¹-acylated phenylhydrazone derivatives, which are obtained by the method of the present invention, have psychic, stimulating, anti-tumor, bactericidal, and fungicidal activities and they are very important compounds as intermediates for producing remarkably effective anti-inflammatory and anti-cholesterolemic drugs, analgesics and anti-pyretics.

Next, the process for producing an N¹-acylated phenylhydrazine derivative (II) by decomposing an N¹-acylated phenylhydrazone derivative (IV) will be described.

An N¹-acylated phenylhydrazone derivative (IV) is dissolved or suspended in an adequate solvent, for example, methanol, ethanol, benzene or toluene. Thereto is added more than equivalent amount of an acid. As an acid, an inorganic acid or an organic acid can be used, among which an inorganic acid such as gaseous hydrogen chloride is preferable to give a good result. If hydrochloric acid is used, a HCl salt of the N¹-acylated phenylhydrazine derivative (II) precipitates as crystals in good yield. Sulfuric acid or others can be used in place of gaseous hydrogen chloride. When ether, benzene or toluene is used as the solvent, a small quantity of alcohol should be added to it.

The reaction temperature is preferably 0°–25° C., though it may be below 0° C.

As the N¹-acylated phenylhydrazone derivative (IV), various compounds can be illustrated. For example, the hydrazones of acetaldehyde, chloral, benzaldehyde, acetal, ethyl acetoacetate and methoxy acetone can be easily decomposed in general cases to give the aimed N¹-acylated phenylhydrazine derivative (II). Among them, the hydrazone of acetaldehyde has especially distinctively commercial advantages.

Examples of the N¹-acylated phenylhydrazine derivatives (II) obtained by the method of the present invention, include:

N¹-(2-hydrindenylformyl -N¹-(p-methoxyphenyl) hydrazine
N¹-(Δ¹-tetrahydrobenzoyl)-N¹-(m-methoxyphenyl) hydrazine
N¹-(Δ¹-tetrahydrobenzoyl)-N¹-(m-methoxyphenyl) hydrazine
N¹-(2-hydrindenylformyl)-N¹-(p-methoxyphenyl) hydrazine
N¹-(2-hydrindencylformyl)-N¹-(p-methylphenyl) hydrazine
N¹-(2-hydrindencylformyl)-N¹-(p-methylphenyl) hydrazine
N¹-(2-hydrindenylformyl)-N¹-(p-chlorophenyl) hydrazine
N¹-(2-hydrindenylformyl)-N¹-(p-methylthiophenyl) hydrazine
N¹-(4-phenyl-Δ¹-tetrahydrobenzoyl)-N¹-(p-methoxyphenyl) hydrazine
N¹-(α-cyclohexylpropionoyl)-N¹-(p-methoxyphenyl) hydrazine
N¹-(1,2,3,4-tetrahydro-2-naphthoyl)-N¹-(p-methoxyphenyl)hydrazine
N¹-(4-methyl-Δ³-tetrahydrobenzoyl)-N¹-(p-methoxyphenyl)hydrazine
N¹-(cyclohexylformyl)-N¹-(p-methoxyphenyl) hydrazine Their salts, for example, hydrochlorides, sulphates and phosphates, can be easily obtained. All of them are novel compounds that have not been reported in any literature.

These compounds have psychic, stimulating, anti-tumor, bactericidal and fungicidal activities and further they are very important as intermediates for producing strong anti-inflammatory and anti-cholesterolemic drugs, analgesics and anti-pyretics.

In some cases a novel N¹-acylated phenylhydrazine derivative (II) is directly obtained by reacting a phenylhydrazine derivative (VII),

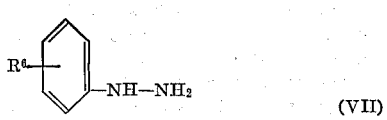

(VII)

wherein R⁶ has the same meaning as identified in the Formula I, or a salt thereof, with a compound (VI)

R¹—CO—Y (VI)

wherein R¹ has the same meanings as identified in the said Formula I and Y is a halogen atom in this case, in the presence of a basic agent.

This reaction is carried out in a conventional solvent such as benzene, toluene, xylene, ether, dioxane or tetrahydrofuran in the presence of a hydrogen halide acceptor such as a tertiary amine. As the tertiary amine, triethyl amine, pyridine or dimethylaniline is suitable and equimolar or larger amount of the acceptor than that of the said phenylhydrazine derivative (VII) is required.

This reaction proceeds so rapidly that the compound (VI) is added slowly to a phenylhydrazine derivative (VII) in a suitable solvent under cooling. The reaction mixture is stirred at room temperature, and if necessary heated to complete the reaction. As a compound of the Formula VI, acid chloride, acid bromide, etc. can be used.

The N¹-acylated derivative (II) thus obtained is contaminated with a by-product such as N²-acylated compound or N¹,N²-diacylated compound. The reactions are shown, for example, as follows:

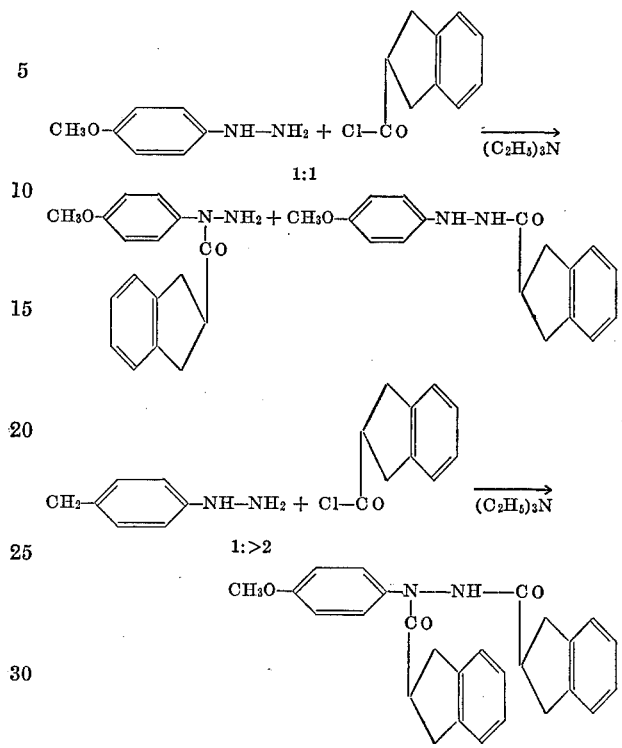

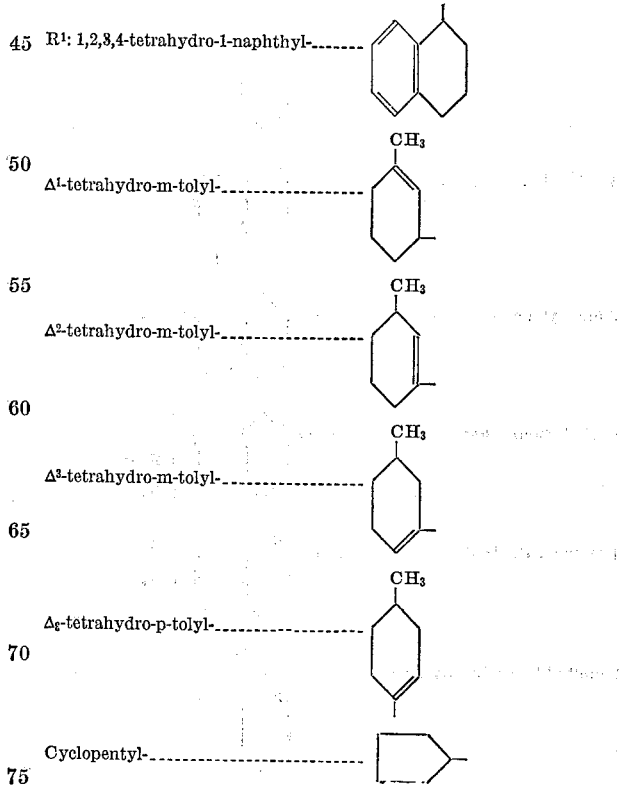

The objective N¹-acylated derivative (II) is easily separated from the by-products by their solubility differences in an organic solvent. However, the purification of the N¹-acylated compound is not necessary in the process, because only the N¹-acylated derivative is concerned with the following reaction in the present invention.

According to the process of the present invention, for example, the compounds having the following substituents, which are represented by R¹ and R⁶ in the said Formula II are obtained.

| R¹ | |
|---|---|
| 1,2,3,4-tetrahydro-1-naphthyl- | |
| Δ¹-tetrahydro-m-tolyl- | |
| Δ²-tetrahydro-m-tolyl- | |
| Δ³-tetrahydro-m-tolyl- | |
| Δ⁶-tetrahydro-p-tolyl- | |
| Cyclopentyl- | |

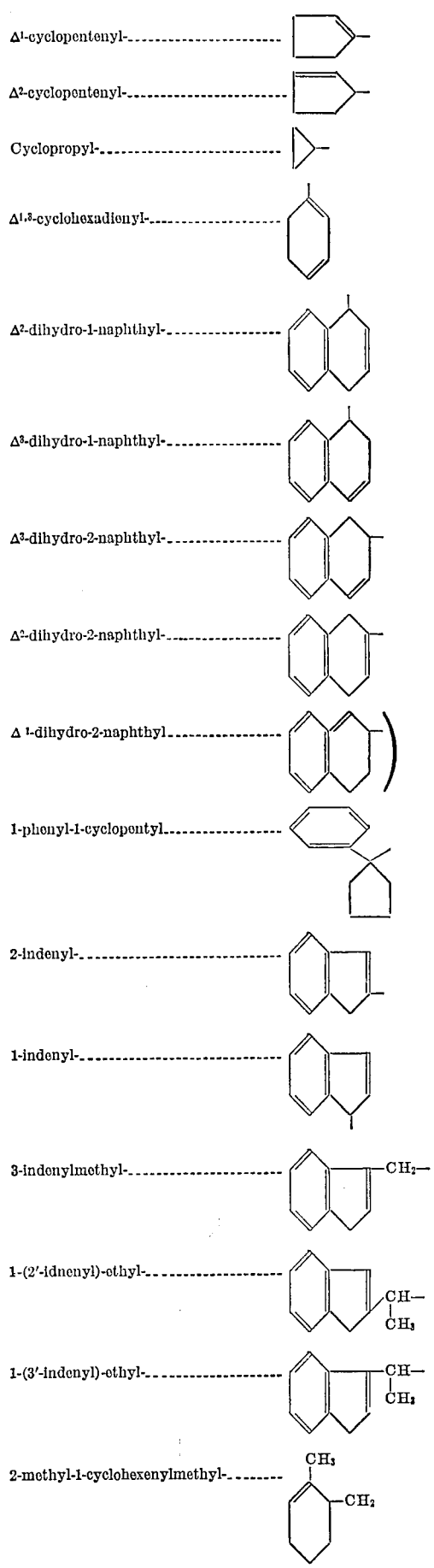
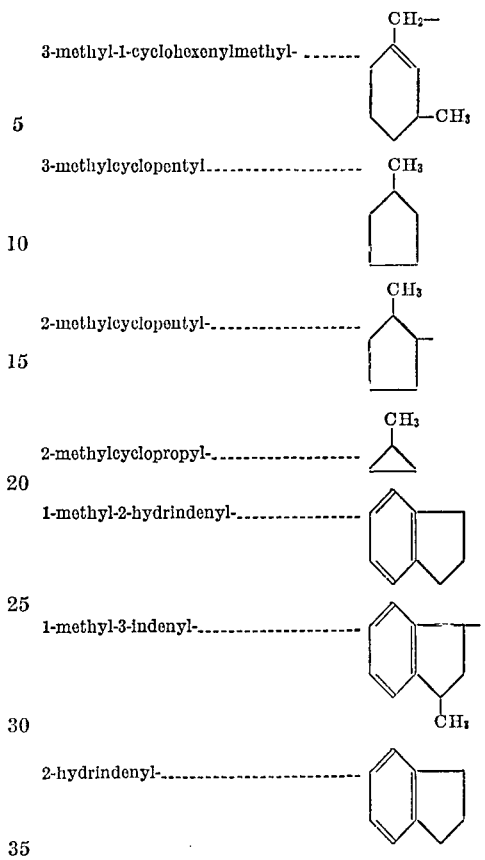

$R^6$: hydrogen, m-chloro-, p-chloro-, m-bromo-, p-methyl-, p-ethyl-, m-ethyl-, m-methoxy-, pmethoxy-, p-ethoxy-, p-methylthio-, p-ethylthio-.

Next the process for producing a 1-acyl-3-indolyl aliphatic acid derivative (I) by the reaction of an $N^1$-acylated phenylhydrazine derivative (II) with an aliphatic acid derivative (III) will be described.

This reaction is carried out by heating in the presence or absence of an adequate condensing agent, in an organic solvent or absence of solvent. The yield is very high.

The present reaction proceeds smoothly even without a solvent, but the reaction is more smoothly carried out in a solvent. An organic acid, for example, acetic acid, formic acid, propionic acid, lactic acid, butyric acid, a non-polar organic solvent, for example, n-hexane, benzene or toluene, and other organic solvent, such as dioxane and dimethyl formamide, can be used as a solvent of this reaction. When an alcohol is used as a solvent in this reaction, a corresponding ester of indole aliphatic acid is produced in some cases.

A 5-substituted indole derivative can be prepared in ring formation reaction of an $N^1$-para-substituted phenylhydrazine derivative, however in case an $N^1$-meta-substituted phenylhydrazine derivative is used, two isomers, 4- and 6-substituted indole derivatives can be obtained as follows: For example,

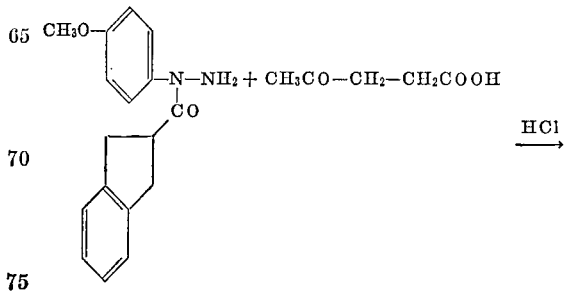

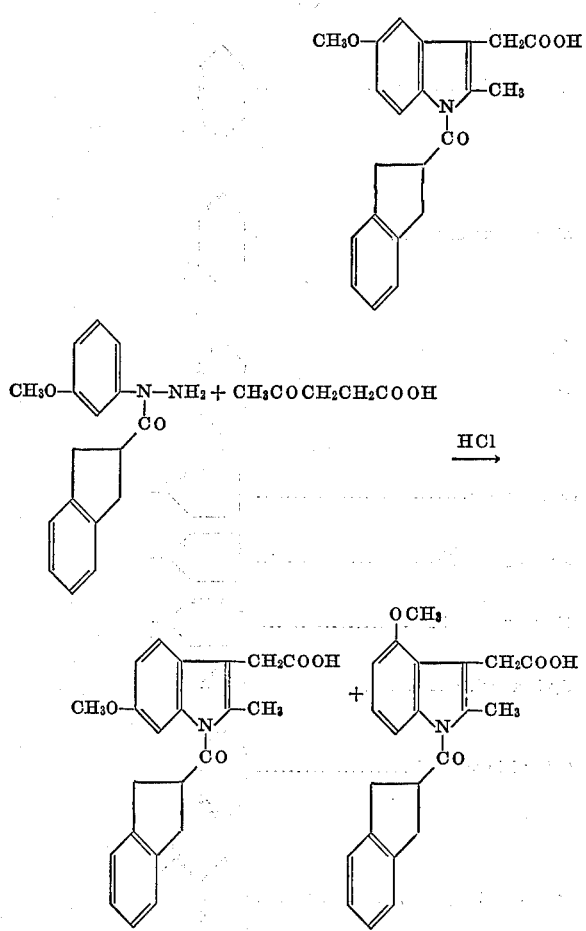

These isomers can be generally separated by column chromatography.

The reaction proceeds smoothly at a temperature within the range of 60° to 140° C. The reaction proceeds rapidly and generally finishes in a short period of time, mostly in one or two hours. The condensing agent is not needed in some cases but desirable results are generally achieved by using a condensing agent. The condensing agent includes inorganic acid such as hydrochloric acid, sulfuric acid and phosphoric acid, metal halides such as zinc chloride and copper chloride, heavy metal powder such as copper powder, boron fluorides or polyphosphoric acid.

In after-treatment, the reaction mixture is allowed to stand at room temperature or in a refrigerator (about 5° C.), then a large amount of crystals of the product is mostly obtained.

When crystals do not produce, the reaction mixture is concentrated under a reduced pressure, or water, acetic acid-water or petroleum ether is adequately added to the mixture, then, beautiful crystals can be obtained. The produced crystals are collected by filtration and they are generally washed with an aqueous solution of acetic acid, alcohol-water, water or petroleum ether before they are dried. Ether, acetone, acetone-water, alcohol, alcohol-water, benzene and acetic acid are generally preferred as a solvent for recrystallization of the present compound. The crystal system varies with a kind of a recrystallization solvent. Objective products are generally crystalline, but oily products are sometimes given in the ester compounds.

Reaction solvents, reaction conditions, condensing agents and recrystallization solvents which have been mentioned above are only presented as illustrative of the present invention but not in its limitation, needless to speak of.

The compounds having following substituents, for example, are easily obtained in good yield, theoretically or in nearly theoretically, according to the process of the present invention.

1-($\Delta^{1'}$-tetrahydrobenzoyl)-2-methyl-5-methoxy-3-indolylacetic acid 1-($\Delta^{1'}$-tetrahydrobenzoyl)-2-methyl-5-chloro-3-indolylacetic acid 1-($\Delta^{1'}$-tetrahydrobenzoyl)-5-methoxy-3-indolylacetic acid 1-($\Delta^{1'}$-tetrahydrobenzoyl)-2,5-dimethyl-3-indolylacetic acid 1-($\Delta^{1'}$-tetrahydrobenzoyl)-2-methyl-3-indolylacetic acid 1-($\Delta^{1'}$-tetrahydrobenzoyl)-2-methyl-5-methylthio-3-indolylacetic acid 1-($\Delta^{1}$-tetrahydrobenzoyl)-2-methyl-5-ethoxy-3-indolylacetic acid Dimethyl 1-($\Delta^{1'}$-tetrahydrobenzoyl)-2-methyl-5-methoxy-3-indolylmalonate 1-($\Delta^{1'}$-tetrahydrobenzoyl)-2-methyl-5-methoxy-3-indolylacetic acid amide Tertiary butyl 1-($\Delta^{1'}$-tetrahydrobenzoyl)-2-methyl-5-methoxy-3-indolylacetate Ethyl 1-($\Delta^{1'}$-tetrahydrobenzoyl)-2-methyl-5-methoxy-3-indolylacetate Methyl 1-($\Delta^{1'}$-tetrahydrobenzoyl)-2-methyl-5-methoxy-3-indolylacetate Tetrahydropyranyl 1-($\Delta^{1'}$-tetrahydrobenzoyl)-2-methyl-5-methoxy-3-indolylacetate

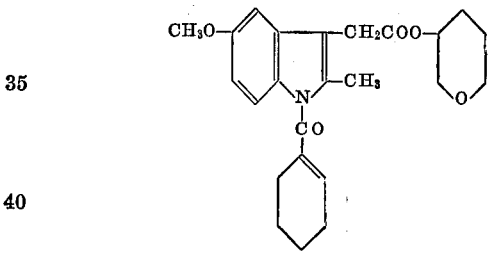

$\gamma$-[1-($\Delta^{1'}$-tetrahydrobenzoyl)-2-methyl-5-methoxy-3-indolyl]-butyric acid

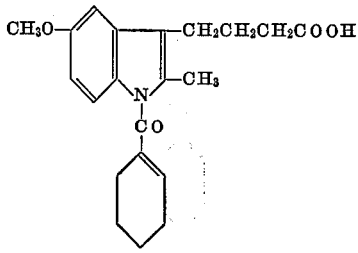

$\alpha$-[1-($\Delta^{1'}$-tetrahydrobenzoyl)-2-methyl-5-methoxy-3-indolyl]-propionic acid 1-($\Delta^{1'}$-tetrahydro-4'-phenylbenzoyl)-2-methyl-5-methoxy-3-indolylacetic acid 1-($\Delta^{1'}$-tetrahydrobenzoyl)-2-methyl-4-methoxy-3-indolylacetic acid and 1-($\Delta^{1'}$-tetrahydrobenzoyl)-2-methyl-6-methoxy-3-indolylacetic acid 1-($\Delta^{1'}$-tetrahydrobenzoyl)-2,4-dimethyl-3-indolylacetic acid and 1-($\Delta^{1'}$-tetrahydrobenzoyl)-2,6-dimethyl-3-indolylacetic acid 1-($\Delta^{1'}$-tetrahydrobenzoyl)-4-methyl-3-indolylacetic acid and 1-($\Delta^{1'}$-tetrahydrobenzoyl)-6-methyl-3-indolylacetic acid 1-(1',2',3',4'-tetrahydro-2'-naphthoyl)-2-methyl-5-methoxy-3-indolylacetic acid 1-(Δ³′-tetrahydro-4′-methylbenzoyl)-2-methyl-5-methoxy-3-indolylacetic acid

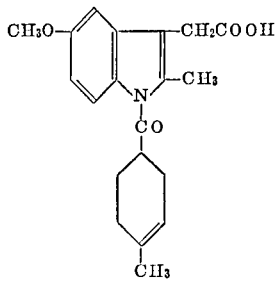

1-tricyclenoyl-2-methyl-5-methoxy-3-indolyacetic acid

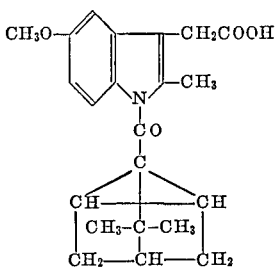

1-(cyclohexylchloroacetyl)-2-methyl-5-methoxy-3-indolylacetic acid

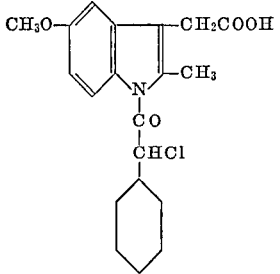

1-(α′-cyclohexylpropionoyl)-2-methyl-5-methoxy-3-indolylacetic acid

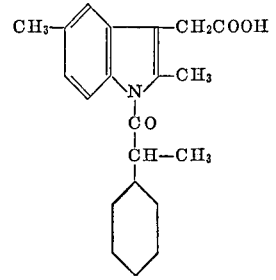

γ-[1-(α′-cyclohexylpropionoyl-2,5-dimethyl-3-indolyl]-butyric acid.
α-[1-(α′-cyclohexylpropionoyl)-5-chloro-3-indolyl]-propionic acid.
1-(α′-cyclohexylpropionoyl)-4-methylthio-3-indolylacetic acid and
1-(α′-cyclohexylpropionoyl)-6-methylthio-3-indolylacetic acid.

In addition to these, there are easily obtained compounds having as R² the following substituents:

X¹-tetrahydro-m-tolyl- 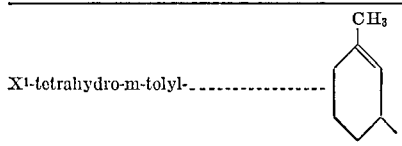

Δ²-tetrahydro-m-tolyl- 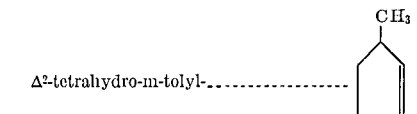

Δ³-tetrahydro-m-tolyl- 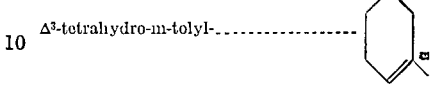

Δ³-tetrahydro-p-tolyl- 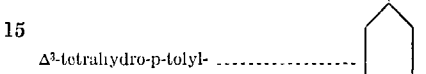

Cyclopentyl- 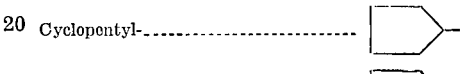

Δ¹-cyclopentenyl- 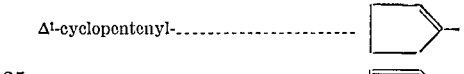

Δ²-cyclopentenyl- 

Cyclopropyl- 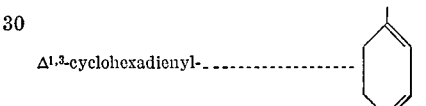

Δ¹,³-cyclohexadienyl- 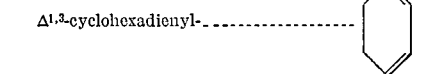

Δ²-dihydro-1-naphthyl- 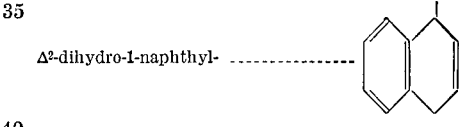

Δ³-dihydro-1-naphthyl- 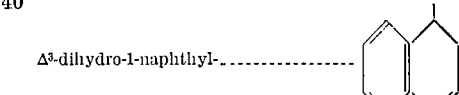

Δ³-dihydro-2-naphthyl- 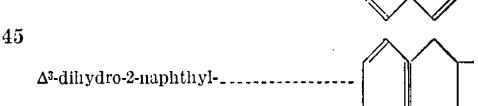

Δ²-dihydro-2-naphthyl- 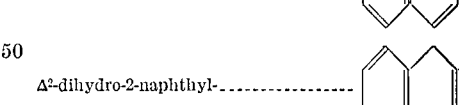

Δ¹-dihydro-2-naphthyl- 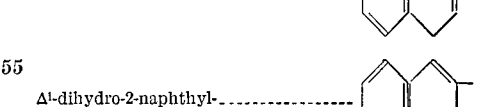

1-phenyl-1-cyclopentyl- 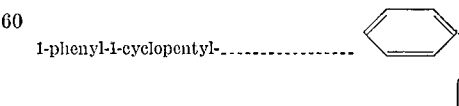

2-indenyl- 

1-indenyl- 

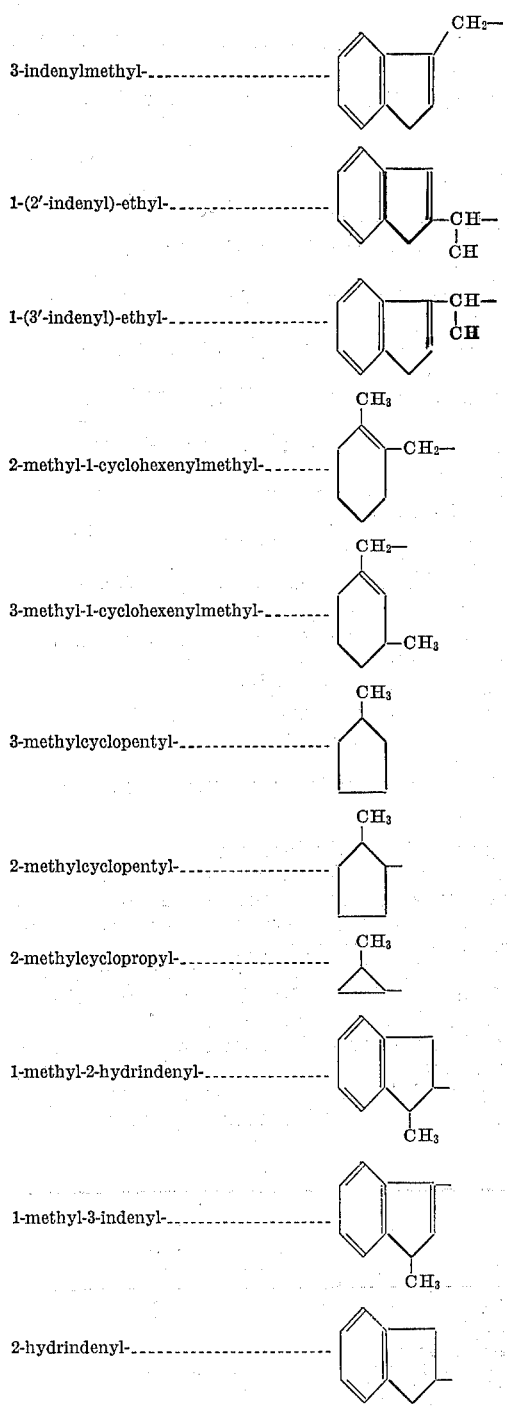

| | |
|---|---|
| 3-indenylmethyl- | |
| 1-(2'-indenyl)-ethyl- | |
| 1-(3'-indenyl)-ethyl- | |
| 2-methyl-1-cyclohexenylmethyl- | |
| 3-methyl-1-cyclohexenylmethyl- | |
| 3-methylcyclopentyl- | |
| 2-methylcyclopentyl- | |
| 2-methylcyclopropyl- | |
| 1-methyl-2-hydrindenyl- | |
| 1-methyl-3-indenyl- | |
| 2-hydrindenyl- | |

Many other 1-acyl-3-indolyl aliphatic acid derivatives can be thus synthesized.

Further in some cases a 1-acyl-3-indolylacetic acid derivative of the formula,

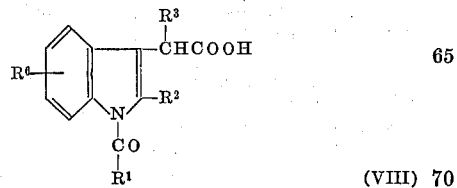

(VIII)

wherein $R^1$, $R^2$, $R^3$ and $R^6$ have the same meanings as identified in the Formula I, is prepared from an $N^1$-acyl phenylhydrazine derivative (II) or salt thereof and a keto-dicarboxylic acid of the Formula IX or X.

In this reaction, a phenylhydrazine derivative of the Formula II is heated with a keto-dicarboxylic acid of the Formula IX or X in the presence or absence of a condensing agent in an organic solvent or absence of organic solvent.

The reaction temperature is within the range of 45° to 200° C., preferably 60° to 140° C. As an organic solvent, organic acids such as formic acid, acetic acid, propionic acid and butyric acid, a hydrocarbon such as benzene, toluene, xylene, cyclohexane and n-hexane, dioxane, isopropyl ether, acetonitrile, butanol, ethyleneglycolether and the others can be used.

As a condensing agent, inorganic acids such as hydrochloric acid and sulfuric acid, metal halides such as zinc chloride and copper chloride, boron fluoride, polyphosphoric acid and the others can be used.

This process does not require a complicated manner or operation and the yield is remarkably high.

For example, this process is shown as follows:

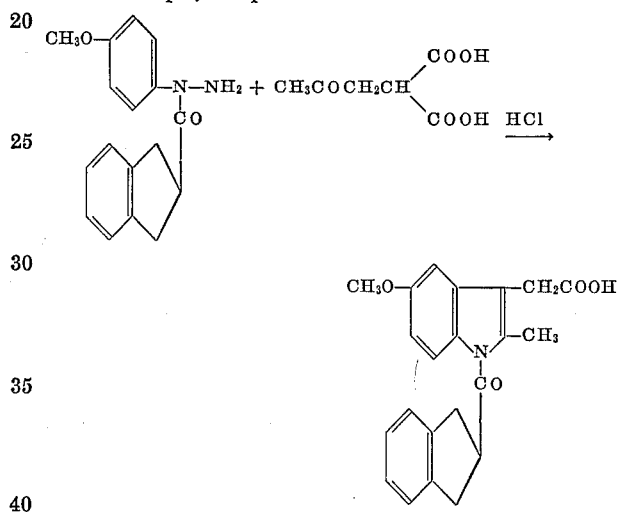

Still further, according to the present invention a 1-acyl-3-indolyl aliphatic acid derivative (XI) is obtained by converting an ester or amide derivative (XII) of a corresponding 3-indolyl aliphatic acid (XI).

For example, a benzyl ester of a 3-indolyl aliphatic acid is converted to a free 3-indolyl aliphatic acid derivative by hydrogenating with decomposition in the presence of a metal catalyst such as palladium.

If the alcohol moiety of the ester compound (XIII) is tertiary butyl alcohol or tetrahydropyranyl alcohol, the ester is treated with an arylsulfonic acid such as p-toluenesulfonic acid to yield an objective product.

This method is shown, for example, as follows.

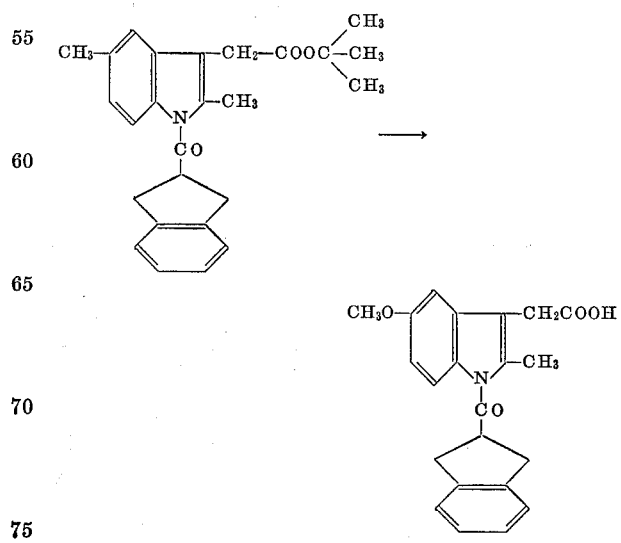

Even if a tertiary butyl ester is only fused by heating, it is decomposed to yield an objective free 3-indolyl aliphatic acid derivative (XI).

Sometimes a free 3-indolyl aliphatic acid compound may be obtained by treating an amide of the corresponding 3-indolyl aliphatic acid compound with a suitable amount of nitrous acid or its salt in an inert solvent.

The following compounds, for example, are prepared by this method.

1-(2'-hydrindenylformyl)-2-methyl-5-methoxy-3-indolylacetic acid
1-(cyclohexylformyl)-2-methyl-5-methoxy-3-indolylacetic acid
1-(cyclohexylacetyl)-2-methyl-5-methoxy-3-indolylacetic acid
1-(cyclopentenylformyl)-2-methyl-5-methoxy-3-indolylacetic acid
1-($\Delta^1$-tetrahydrobenzoyl)-2-methyl-5-methoxy-3-indolylacetic acid
1-($\alpha$-cyclohexylpropionyl)-2,4-dimethyl-3-indolylacetic acid
1-($\alpha$-cyclohexylpropionyl)-2,6-dimethyl-3-indolylacetic acid
1-($\Delta^1$-tetrahydro-m-methylbenzoyl)-2-methyl-5-methoxy-3-indolylacetic acid
1-($\Delta^2$-cyclopentenylformyl)-2-methyl-5-methoxy-3-indolylacetic acid
1-(2'-indenylformyl)-5-methyl-3-indolylacetic acid
$\gamma$-{1-(3'-indenylacetyl)-2-methyl-5-chlor-3-indolyl}-butyric acid
$\gamma$-{1-hydrindenylformyl-2-methyl-5-methoxy-3-indolyl}-butyric acid The esters which are the starting materials used in this reaction are prepared in the following manners:

That is, 3-indolyl aliphatic acid esters represented by the general formula,

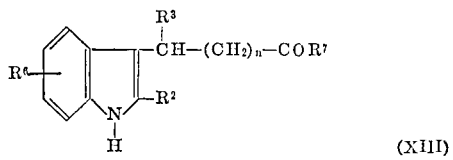

wherein $R^2$, $R^3$, $R^6$ and $n$ are as defined before and $R^7$ is an alkoxy, tetrahydropyranyloxy or benzyloxy group, are reacted with an acyl compound represented by the general formula

$$R^1\text{—CO—Y} \qquad (VI)$$

wherein $R^1$ and X are as defined before, whereby 1-alicyclic compound-substituted 3-indolyl aliphatic acid esters represented by the general Formula XII

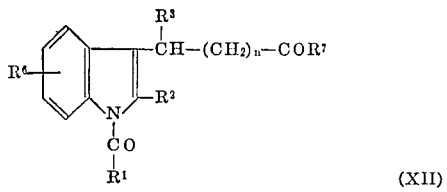

wherein $R^1$, $R^2$, $R^3$, $R^6$ and $n$ are as defined before and $R^7$ is as defined in the Formula XIII.

The above reaction is effected in the presence of an inert solvent such as, for example, benzene, toluene, xylene, dimethylformamide, ether, tetrahydrofuran or dioxane. Generally, the 3-indolyl aliphatic acid ester is treated with sodium amide, sodium hydride or Grignard's reagent, and is then subjected to acylation. As the acylating agent, an acyl halide, acid anhydride or mixed acid anhydride is used. Generally, the reaction proceeds at room temperature. In case the progress of the reaction is slow, the reaction system may be heated to a suitable temperature.

According to this method, the following compounds are obtained:

Tertiary-butyl 1-(2'-hydrindenylformyl)-2-methyl-5-methoxy-3-indolylacetate
Tertiary-butyl 1-(cyclohexylformyl)-2-methyl-5-methoxy-3-indolylacetate
Tertiary-butyl 1-(cyclohexylacetyl)-2-methyl-5-methoxy-3-indolylacetate
Tertiary-butyl 1-cyclopentylformyl-2-methyl-5-methoxy-3-indolylacetate
Benzyl 1-($\Delta^1$-tetrahydrobenzoyl)-2-methyl-5-methoxy-3-indolylacetate
Benzyl 1-($\alpha$-cyclohexylpropionoyl)-2,4-dimethyl-3-indolylacetate
Benzyl 1-($\alpha$-cyclohexylpropionoyl)-2,6-dimethyl-3-indolylacetate.
Benzyl 1-($\Delta^1$-tetrahydro-m-methylbenzoyl)-2-methyl-5-methoxy-3-indolylacetate.
Tetrahydropyranyl 1-($\Delta^2$-cyclopentylformyl)-2-methyl-5-methoxy-3-indolylacetate.
Tetrahydropyranyl 1-(2'-indenylformyl)-5-methyl-3-indolylacetate.
Tetrahydropyranyl $\gamma$-{1-(3'-indenylacetyl)-2-methyl-5-chloro-3-indolyl}-butyrate.
Tetrahydropyranyl $\gamma$-{1-hydrindenylformyl-2-methyl-5-methoxy-3-indolyl}-propionate.
Tertiary-butyl $\gamma$-{1-hydrindenylformyl-2-methyl-5-methoxy-3-indolyl}-propionate.
Ethyl 1-($\Delta^{1'}$-tetrahydrobenzoyl)-2-methyl-5-methoxy-3-indolyl-acetate.
Methyl 1-(2'-hydrindenylformyl)-2-methyl-5-methoxy-3-indolylacetate.

Among novel 3-indolyl aliphatic acid derivatives of the present invention, there are not a few useful compounds, which have excellent anti-inflammatory, anti-pyretic and analgesic activities but also extremely low toxicity. For example, as we can see from pharmacologically experimental results of the Table 1, the present compounds such as 1-(2'-hydrindenylformyl)-2-methyl-5-methoxy - 3 - indolylacetic acid and 1-(cyclohexylformyl)-2-methyl-5-methoxy-3-indolylacetic acid showed low toxicity in spite of their potential anti-inflammatory action. Therefore, we can say that their therapeutic ratio is much greater than that of other first class anti-inflammatory drugs.

TABLE 1

| Compound | Action | | Therapeutic ratio $LD_{50}/ED_{50}$ |
|---|---|---|---|
|  | $ED_{50}$* (mg./kg.) | $LD_{50}$** (mg./kg.) |  |
| Phenylbutazone | 230 | 720 | 3.2 |
| 1-(2'-hydrindenoyl)-2-methyl-5-methoxy-3-indolylacetic acid (present compound) | 130 | >1,500 | >11.5 |
| 1-(cyclohexylformyl)-2-methyl-5-methoxy-3-indolylacetic acid (present compound) | 240 | >1,500 | >6.3 |

* 50% inhibitory oral dose of edema induced in the rats' hind paw after injection of carrageenin.
** 50% lethal dose for one week after oral administration to rats.

Phenylbutazone is a representative anti-inflammatory drug and one of the best drugs which are most widely used now, but its effect is rather low in spite of high acute toxicity.

On the other hand, these compounds shown in the above table did not develop toxic symptoms in rates even after oral administration of more than 1,000 mg./kg. dose and its toxicity was minimum low. In these cases, occult bleeding in their feces was negative. But, the effects of the present compounds are considerably high in comparison with phenylbutazone, oxyphenbutazone and the like. Therefore, therapeutic ratios of these compounds are far greater than those of the first class nonsteroidal anti-inflammatory drugs. It goes without saying that these compounds are extremely great valuable in practical field.

EXAMPLE 1

To a solution of 25 g. of acetaldehyde p-methoxyphenylhydrazone in 250 ml. of dry ether was added 13.2 g. of dry pyridine. The mixture was maintained at −2°∼1° C. while 24.5 g. of cyclohexanecarboxylic chloride was added dropwise. After an addition, stirring was continued for additional 3 hours. The resultant precipitate was collected by filtration, dissolved with water and extracted with ether. The ether layer was combined with the filtrate, and the mixture solution was washed with water and dried over anhydrous sodium sulfate. Thereafter, anhydrous sodium sulfate was removed by filtration. To the ether layer was added petroleum ether, and the resultant precipitate was collected by filtration, and then washed with petroleum ether and dried to give 12 g. of yellow crystals of acetaldehyde $N^1$-(cyclohexylformyl)-$N^1$ - p - methoxyphenylhydrazone. The melting point was 108°–111° C.

EXAMPLE 2

To a solution of 35 g. of acetaldehyde p-methoxyphenylhydrazone in 350 ml. of dry ether was added 17.8 g. of dry pyridine. The mixture was maintained at 0–3° C., while 30 g. of cyclopentane carboxylic chloride was added dropwise over 1 hours. After an addition, stirring at the same temperature was continued for addition 3 hours. The resultant yellow crystals were collected by filtration, washed with water and then with ether to give 23 g. of colorless crystals of acetaldehyde $N^1$-(cyclopentylformyl)-$N^1$-(p-methoxyphenyl)hydrazone. The melting point was 101.5°–102.5° C.

EXAMPLE 3

Yellow crystals of acetaldehyde $N^1$-(2'-hydrindenylformyl)-$N^1$-phenylhydrazone were prepared from acetaldehyde phenylhydrazone by a similar method to Example 2. The melting point was 115°–120° C.

EXAMPLE 4

Yellow crystals of benzaldehyde $N^1$-(2'-hydrindenylformyl)-$N^1$-phenylhydrazine were prepared from acetaldehyde phenylhydrazone by a similar method to Example 2. The melting point was 135°–140° C.

EXAMPLE 5

Yellow crystals of acetaldehyde $N^1$-2'-hydrindenylacetyl-$N^1$-phenylhydrazone were prepared from acetaldehyde phenylhydrazone by a similar method of Example 2. The melting point was 125°–128° C.

EXAMPLE 6

Colorless crystals of acetaldehyde $N^1$-(3'-methyl-1'-cyclohexylformyl)-$N^1$-(p-methoxyphenyl)hydrazone were prepared from acetaldehyde p-methoxyphenylhydrazone by a similar method of Example 2. The melting point was 106°–109° C.

EXAMPLE 7

Yellow crystals of acetaldehyde $N^1$-(2'-indenylpropionyl)-$N^1$-(p-chlorophenyl)hydrazone were prepared from acetaldehyde p-chlorophenylhydrazone by a similar method to Example 2. The melting point was 125°–130° C.

EXAMPLE 8

Colorless crystals of acetaldehyde $N^1$-(cyclohexylacetyl)-$N^1$-(p-methylthiophenyl)hydrazone were prepared from acetldehyde p-methylthiophenylhydrazone by a similar method to Example 2.

EXAMPLE 9

Colorless crystals of acetaldehyde $N^1$-(cyclohexylformyl)-$N^1$-(p-methylphenyl)hydrazone were prepared from acetaldehyde p-methylphenylhydrazone by a similar method to Example 2.

EXAMPLE 10

Into a suspension of 6 g. of acetaldehyde $N^1$-(cyclohexylformyl)-$N^1$-(p-methoxyphenyl)hydrazone in 15 ml. of dry ethanol was slowly introduced gaseous hydrogen chloride at ice-salt temperatures. Crystals was dissolved and color of the solution changed to blue. After saturation of gaseous hydrogen chloride was removed under reduced pressure and a large amount of ether was added to the mixture. The resultant crystals were collected by filtration, washed with water, and dried to give 4.2 g. of colorless needles of $N^1$-(cyclohexylformyl)-$N^1$-(p-methoxyphenyl)-hydrazine hydrochloride. The melting point was 184° C. (decomposition).

EXAMPLE 11

Colorless needles of $N^1$-(cyclopentylformyl)-$N^1$-(p-methoxyphenyl)-hydrazine hydrochloride were prepared from acetaldehyde $N^1$-(cyclopentylformyl)-$N^1$-(p-methoxyphenyl)-hydrazone by the same method with Example 10. The melting point was 177° C. (decomposition).

EXAMPLE 12

Yellow crystals of $N^1$-(2'-hydrindenylformyl)-$N^1$-(phenyl)hydrazine hydrochloride were prepared from acetaldehyde $N^1$-(2'-hydrindenylformyl)-$N^1$-(phenyl)hydrazone by the same method with Example 10. The melting point was 161° C. (decomposition).

EXAMPLE 13

A mixture of 3 g. of $N^1$-(2'-hydrindenylformyl)-$N^1$-(p-methoxyphenyl)hydrazine hydrochloride, 6 g. of levulinic acid, and 5 ml. of glacial acetic acid were stirred under heating at 85° C. for 2 hours. After cooling, the reaction mixture was poured into cold water, and the resultant precipitate was collected by filtration and washed with water. Recrystallization from a mixture of acetone and water gave 1.5 g. of 1-(2'-hydrindenylformyl)-2-methyl-5-methoxy-3-indolylacetic acid, having the melting point of 168.5°–169° C.

*Analysis.*—Calculated for $C_{22}H_{21}O_4N$ (percent): C, 72.71; H, 5.83; N, 3.85. Found (percent): C, 73.02; H, 5.77; N, 3.77.

EXAMPLE 14

A mixture of 3 g. of $N^1$-(2'-hydrindenylformyl)-$N^1$-(p-methoxyphenyl)hydrazine hydrochloride, 1.4 g. of δ-acetyl-n-pentanoic acid and 5 ml. of glacial acetic acid was heated at 85° C. for 3.5 hours with stirring. After cooling, the mixture was poured into cold water, and the resultant black oily substance was precipitated. The precipitate was removed by filtration and was washed with water throughly. Recrystallization twice from a mixture of methanol and water gave colorless crystals of 1.5 g. of γ - {1 - (2' - hydrindenylformyl) - 2 - methyl-5-methoxy-3-indolyl}butyric acid, having the melting point of 132.5°–133.5° C.

*Analysis.*—Calculated for $C_{24}H_{25}O_4N$ (percent): C, 73.64; H, 6.44; N, 3.58. Found (percent): C, 73.87; H, 6.31; N, 3.72.

EXAMPLE 15

A mixture of 2 g. of $N^1$-(cyclohexylformyl)-$N^1$-(p-methoxyphenyl)hydrazine hydrochloride, 4 g. of levulinic acid and 1 ml. of glacial acetic acid was heated at 75°–80° C. for 2 hours with stirring. After cooling, the reactant was poured into cold water, and the resultant precipitate was collected by filtration, and washed with water. Recrystallization from a mixture of acetone and water gave colorless needles of 1.0 g. of 1-cyclohexylformyl-2-methyl-5-methoxyl-3-indolylacetic acid, having the melting point of 143.5°–144.5° C.

*Analysis.*—Calculated for $C_{19}H_{23}O_4N$ (percent): C, 69.28; H, 7.04; N, 4.25. Found (percent): C, 69.39; H, 7.11; N, 4.14.

EXAMPLE 16

A mixture of 4 g. of benzaldehyde $N^1$-(2'-hydrindenylformyl)-$N^1$-(p-methoxyphenyl)hydrazone and 15 ml. of levulinic acid containing gaseous hydrogen chloride was heated at 85° C. for 3 hours with stirring. After completion of the reaction, the reaction mixture poured into cold water, and the resultant crystalline solid was collected by filtration, washed with water. Recrystallization twice for a mixture of acetone and water gave yellow 1-(2' - hydrindenylformyl) - 2 - methyl - 5 - methoxy - 3-indolylacetic acid. The melting point was 167°–169° C.

*Analysis.*—Calculated for $C_{22}H_{21}O_4N$ (percent): C, 72.71; H, 5.83; N, 3.85. Found (percent): C, 72.56; H, 6.23; N, 3.44.

EXAMPLE 17

Crystals of 1 - (2' - hydrindenylformyl - 2 - methyl - 5-methoxy-3-indolylacetic acid were prepared from acetaldehyde $N^1$-($2^1$ - hydrindenylformyl)-$N^1$-(p-methoxyphenyl)hydrazone by the same method with Example 16. The melting point was 167°–168.5° C. The infrared absorption spectra of this product was identical with that of crystals of 1 - (2' - hydrindenylformyl) - 2 - methyl - 5-methoxy-3-indolylacetic acid obtained in Example 16.

EXAMPLE 18

To a liquid ammonia was added 0.5 g. of metallic sodium, when the mixture changed to nearly white color, 40 ml. of cold toluene was added thereto and allowed to stand at room temperature overnight. Thereafter, to a suspension of muddy soda amide in toluene was added 4.9 g. of ethyl 2-methyl-5-methoxy-3-indolylacetate and the mixture was stirred under a nitrogen gas stream. A mixture of 3 g. of cyclohexylformyl chloride and 10 ml. of dry toluene was added dropwise to the mixture, which was stirred at room temperature for 3 hours and then was heated at 50° C. for 2 hours. The resultant precipitate was removed by filtration, and the filtrate was concentrated under reduced pressure to oily residue, which was purified by silica gel chromatography to give oily yellow material of ethyl 1-cyclohexylformyl-2-methyl-5-methoxy-3-indolylacetate.

*Analysis.*—Calculated (percent): N, 3.92. Found (percent): N, 3.53.

EXAMPLE 19

Crude tertiary-butyl 1-(2'-hydrindenylformyl)-2-methyl-5-methoxy-3-indolylacetate was obtained as an oily material from tertiary-butyl 2-methyl-5-methoxy-3-indolylacetate by the same method with Example 18. This crude product was used in Example 20 without purification.

EXAMPLE 20

A mixture of 5.0 g. of tertiary-butyl 1-(2'-hydrindenylformyl)-2-methyl-5-methoxy-3-indolylacetate, 40 ml. of benzene and p-toluene sulfonic acid was refluxed. After completion of the reaction, the reaction mixture was allowed to stand at room temperature. After cooling, the mixture was washed with water thoroughly, and then was dried over anhydrous sodium sulfate. The solvent was removed by distillation under reduced pressure. The resultant solid was purified with acetone and acetone-water, and gave crystals of 1-(2'-hydrindenylformyl)-2-methyl-5-methoxy-3-indolylacetic acid having the melting point of 166°–168° C.

A suspension of 3.0 g. of 1-(2'-hydrindenylformyl)-2-methyl-5-methoxy-3-indolylacetic acid in 20 ml. of water was maintained pH 7.0–7.5 while 0.6 g. of sodium hydrocarbonate was added slowly to the mixture. After addition, the mixture was warmed for a few minutes, and the insoluble substance was removed by filtration. The filtrate was concentrated under reduced pressure, to an oily residue, which was extracted with chloroform. The chloroform solution was concentrated to a half of volume and allowed to stand in a refrigerator overnight. The resultant crystals were collected by filtration to give the sodium salt.

EXAMPLE 21

To the mixture of 1 ml. of glacial acetic acid and 1.5 g. of δ-acetylpentanoic acid was added 2 g. of $N^1$-(cyclohexylformyl) - $N^1$ - (p - methoxyphenyl)hydrazine hydrochloride, and the mixture was heated at 80° C. for 2 hours with stirring. The reaction mixture was poured into cold water to give dark brown oily material, which was solidified by cooling. The crystalline solid was removed by filtration, washed with water, and recrystallized from a mixture of ether and petroleum ether to yield 1 g. of white needles of γ-(1-cyclohexylformyl-2-methyl-5-methoxy-3-indolyl)butyric acid. The melting point was 78°–79° C.

*Analysis.*—Calculated for $C_{21}H_{27}O_4N$ (percent): C, 70.56; H, 7.61; N, 3.92. Found (percent): C, 70.28; H, 7.83; N, 4.24.

What we claim is:

1. A 1-acyl-3-indolyl aliphatic acid derivative of the formula,

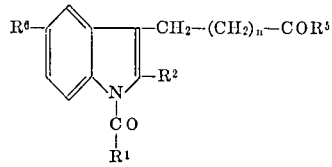

wherein $R^1$ is a $C_3$–$C_6$ cycloalkyl, 2-indenyl or 2'-hydrindenyl; $R^2$ is hydrogen or methyl; $R^5$ is hydroxy, lower alkoxy, benzyloxy, tetrahydropyranyloxy or amino; $R^6$ is methoxy, ethoxy, methyl, ethyl, methylthio or ethylthio or a halo genor hydrogen atom; and $n$ is 0 or an integer of 1 to 3.

2. A compound according to claim 1 wherein $R^2$ is methyl; $R^5$ is hydroxy, lower alkoxy or benzyloxy; $R^6$ is methoxy, methyl, chlorine or hydrogen; and $n$ is 0.

3. A compound according to claim 1 wherein $R^2$ is methyl; $R^5$ is hydroxy or lower alkoxy; $R^6$ is methoxy or chlorine; and $n$ is 0.

4. A compound according to claim 1 wherein $R^2$ is methyl; $R^5$ is hydroxy or lower alkoxy; $R^6$ is methoxy or chlorine; and $n$ is 1 or 2.

5. A 1-acyl-3-indolylacetic acid of the formula,

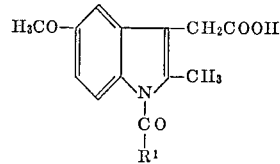

wherein $R^1$ is a $C_3$–$C_6$ cycloalkyl, 2-indenyl or 2'-hydrindenyl group.

6. 1 - cyclopropylformyl - 2 - methyl - 5 - methoxy - 3-indolylacetic acid.

7. 1 - cyclohexylformyl - 2 - methyl - 5 - methoxy - 3-indolylacetic acid.

8. 1 - (2' - idenylformyl) - 2 - methyl - 5 - methoxy-3-indolylacetic acid.

9. 1 - (2' - hydrindenylformyl) - 2 - methyl - 5 - methoxy-3-indolylacetic acid.

References Cited

UNITED STATES PATENTS 3,271,394   9/1966   Shen _____ 260—247.2

ALEX MAZEL, Primary Examiner

J. A. NARCAVAGE, Assistant Examiner

U.S. Cl. X.R.

260—326.12, 557; 424—274, 324